United States Patent
Wang

(10) Patent No.: US 11,055,308 B2
(45) Date of Patent: Jul. 6, 2021

(54) SYSTEMS AND METHODS FOR INTEGRATED DYNAMIC RUNTIME ETL TOOL AND SCALABLE ANALYTICS SERVER PLATFORM

(71) Applicant: Open Text Holdings, Inc., San Mateo, CA (US)

(72) Inventor: Jamie Wang, Daly City, CA (US)

(73) Assignee: OPEN TEXT HOLDINGS, INC., San Mateo, CA (US)

(*) Notice: Subject to any disclaimer, the term of this patent is extended or adjusted under 35 U.S.C. 154(b) by 229 days.

(21) Appl. No.: 16/119,567

(22) Filed: Aug. 31, 2018

(65) Prior Publication Data

US 2020/0073990 A1 Mar. 5, 2020

(51) Int. Cl.
*G06F 17/00* (2019.01)
*G06F 7/00* (2006.01)
*G06F 16/25* (2019.01)
*G06F 16/13* (2019.01)
*G06F 16/51* (2019.01)

(52) U.S. Cl.
CPC ........... *G06F 16/254* (2019.01); *G06F 16/13* (2019.01); *G06F 16/51* (2019.01)

(58) Field of Classification Search
CPC ......... G06F 16/254; G06F 16/51; G06F 16/13
USPC ....................................................... 707/602
See application file for complete search history.

(56) References Cited

U.S. PATENT DOCUMENTS

| | | | |
|---|---|---|---|
| 10,360,053 B1* | 7/2019 | Christensen | G06F 9/50 |
| 10,540,191 B2* | 1/2020 | Christensen | G06F 9/50 |
| 10,685,033 B1* | 6/2020 | Searls | G06F 16/254 |
| 2007/0220370 A1* | 9/2007 | Branda | G06F 11/3688 714/49 |
| 2008/0115135 A1* | 5/2008 | Behnen | G06Q 10/00 718/101 |
| 2011/0004446 A1* | 1/2011 | Dorn | G01D 4/002 702/188 |
| 2015/0371047 A1* | 12/2015 | Mendelev | H04L 63/1433 726/25 |
| 2016/0350209 A1* | 12/2016 | Belyy | G06F 9/44505 |
| 2018/0069925 A1* | 3/2018 | Lavasani | G06F 16/2379 |
| 2019/0370263 A1* | 12/2019 | Nucci | G06F 16/258 |

* cited by examiner

*Primary Examiner* — Pavan Mamillapalli
(74) *Attorney, Agent, or Firm* — Sprinkle IP Law Group

(57) ABSTRACT

One embodiment comprises a method in which an integrated multi-user analytics server platform is integrated with a dynamic runtime ETL tool to allow dataflows created or developed in a dynamic runtime environment provided by the ETL tool to be saved in a novel dataflow file container. The method includes: presenting a user interface for an analytics server platform; receiving user input via this user interface indicating an action to be performed as to a first dataflow; the analytics server platform accessing a first file container corresponding to the first dataflow, where the first file container is stored in a data store connected to the analytics server platform; in response to receiving the user input, the analytics server platform accessing APIs of the dynamic runtime ETL tool to initiate the ETL tool, which then performs the action with respect to the first dataflow.

17 Claims, 4 Drawing Sheets

SYSTEMS AND METHODS FOR INTEGRATED DYNAMIC RUNTIME ETL TOOL AND SCALABLE ANALYTICS SERVER PLATFORM

TECHNICAL FIELD

This disclosure relates generally to content analytics and more particularly to systems, methods, and computer program products which are used in conjunction with dynamic runtime Extract, Transform, Load (ETL) tools to enable management functions which are not provided by the ETL tools, such as the storage of dataflows and management of user access to individual dataflows.

BACKGROUND OF THE RELATED ART

"Extract, transform, load" (ETL) refers to a process in computing (particularly in relation to data warehousing), in which data is extracted from data sources, transformed to a preferred format or structure and loaded into a target store. The ETL tool may conform or homogenize data so that disparate sources can be used together, enforce data quality and consistency, and provide data in a readily usable format and location so that end users can query, analyze and otherwise use the data.

Various ETL tools are available. Apache NiFi is one of the more popular ETL tools. NiFi is an open-source process modeler which is widely used for processing and distributing data. NiFi automates and manages the flow of information between systems, and supports powerful and scalable directed graphs of data routing, transformation, and system mediation logic. NiFi, which was based on the Niagarafiles software developed by the NSA, was developed to enhance and boost the underlying capacities of the host system on which NiFi is operating by automating dataflow between two systems, one of which is creating the data, and the other of which is consuming the data.

NiFi is based on the concept of ensured and guaranteed deliveries. NiFi provides effective load spreading and high transaction rates. It supports buffering, so data can be queued until it can reach its intended destination. NiFi can also support prioritized queuing, and can handle situations in which particular data (e.g., largest or newest data) should be processed first. NiFi is based on a flow-based programming model and provides features such as the ability to operate within clusters, implementing security using TLS encryption, extensibility (users can write their own software to extend its abilities) and improved usability (e.g., capability to view and modify behavior visually).

NiFi, however, has several problems that can make it somewhat confusing and difficult to organize. For example, in a NiFi environment, there is only a single canvas on which all dataflows must be developed. If a new dataflow is desired, the dataflow is added to the NiFi canvas. If there are only a few dataflows, this may not be a problem, but it is frequently necessary for users to develop many different dataflows, and each one must be added to the same NiFi canvas, which can result in a sprawling and difficult-to-navigate tangle of processes. While users can place processor components of a dataflow into processor groups, it is not possible to segregate any of the dataflows into separate files. Further, in a multi-user NiFi environment, all of the users login to the same NiFi canvas, so that each of the users sees all of the dataflows in the canvas. The users are not restricted to seeing and working with only the dataflows for which they have corresponding permissions. Since NiFi cannot separately save individual dataflows or restrict users to access only those dataflows for which they have corresponding permissions, organization of the dataflows may be very difficult.

It would therefore be desirable to provide systems, methods and products that provide capabilities which are not found in conventional ETL tools such as NiFi.

SUMMARY OF THE DISCLOSURE

Some of the problems associated with NiFi and other ETL tools may be reduced or eliminated by embodiments of the present invention, where an interface for a data analytics server platform is integrated with a dynamic runtime ETL tool to enable functionality through the analytics server platform that is not available in the ETL tool itself. In one embodiment, an analytics server platform provides a user interface that allows users to access dataflow assets that are associated with the respective users, or that the users have been granted permission to access. When a user accesses a dataflow through this interface, an object created by the analytics server platform tracks the creation and/or development of the dataflow and is stored by the analytics server platform in a file container. The analytics server platform uses separate file containers to store different dataflows, which facilitates organization of the dataflows (e.g., according to data types, process types or other relevant characteristics). The use of the different file containers to store associated dataflows also enables the different dataflows to be individually accessed, so that a user does not have to deal with other, possibly unrelated dataflows that have to be maintained in the same NiFi canvas. The different file containers and associated dataflows may have corresponding permissions, so that only certain users (e.g., owners or others who have been given permission) can access (e.g., view, read, write or execute) the dataflows.

One embodiment comprises a method in which an integrated multi-user analytics server platform is integrated with a dynamic runtime ETL tool to allow dataflows created or developed in a dynamic runtime environment provided by the ETL tool to be saved in a novel dataflow file container. The method includes: presenting a user interface for an analytics server platform; receiving in the user interface user input indicating an action to be performed with respect to a first dataflow; the analytics server platform accessing a first file container corresponding to the first dataflow, where the first file container is stored in a data store communicatively connected to the analytics server platform; in response to receiving the user input, the analytics server platform accessing APIs of a dynamic runtime ETL tool to initiate the ETL tool performing the action with respect to the first dataflow; and the dynamic runtime ETL tool performing the action with respect to the first dataflow.

The method may further include opening a process within the analytics server platform and opening an instance of the dynamic runtime ETL tool within the process of the analytics server platform. In one embodiment, the action performed by the dynamic runtime ETL tool is tracked by the analytics server platform process, and information obtained through the tracking of the action is stored by the analytics server platform process in the first file container. The dynamic runtime ETL tool may be a NiFi ETL tool. The method may include the user interface authenticating the user, displaying to the user a first set of assets for which the user has corresponding access permissions, and hiding from the user a second set of assets for which the user does not have corresponding access permissions. In one embodiment, a plurality of separate file containers (including the first file container) may be stored in the data store, where each of the file containers stores a corresponding separately accessible dataflow. The analytics server platform may present separate instances of the user interface to different users in a multi-user environment, where each instance displays to one of the different users a set of dataflows corresponding to a subset of the file containers, where the subsets of the file containers and the corresponding displayed dataflows are different for the different users.

An alternative embodiment comprises a system having a processor and a non-transitory computer-readable medium that stores instructions translatable by the processor to implement a dynamic runtime ETL tool (e.g., NiFi) and a data analytics server platform. The ETL tool provides a capability for a user to create or modify dataflows, but does not directly provide a capability for the user to save the dataflows to corresponding files. The data analytics server platform is adapted to interface with a runtime instance of the ETL tool by accessing APIs of the ETL tool. The user can create or modify the dataflows through the ETL tool, but can also save the dataflows to corresponding file containers in in a data store. In one embodiment, the data analytics server platform is adapted to present a user interface to a user, where the interface is adapted to receive user input indicating an action to be performed with respect to a dataflow. In response to receiving the user input, the analytics server platform is adapted to access the APIs of the dynamic runtime ETL tool and thereby initiate the action (e.g., creating or modifying a dataflow) in the ETL tool, which performs the action with respect to the dataflow. In one embodiment, the data analytics server platform opens an instance of the dynamic runtime ETL tool within a process of the analytics server platform. The process of the analytics server platform may then track the action performed by the dynamic runtime ETL tool and store corresponding in the first file container. The user interface may be adapted to authenticate a user, display a first set of assets for which the user has corresponding access permissions, and hide a second set of assets for which the user does not have corresponding access permissions. The data analytics server platform may be adapted to store multiple, separate file containers, where each of the file containers stores a corresponding separately accessible dataflow. The analytics server platform may be adapted to present separate instances of the user interface to different users in a multi-user environment, where each instance of the user interface displays to a corresponding user a set of dataflows in corresponding file containers, where the dataflows displayed to each user may be different.

Another alternative embodiment comprises a computer program product in which a non-transitory computer-readable medium stores instructions that are translatable by a processor to perform a method, or to implement a system, substantially as described above. Numerous other embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
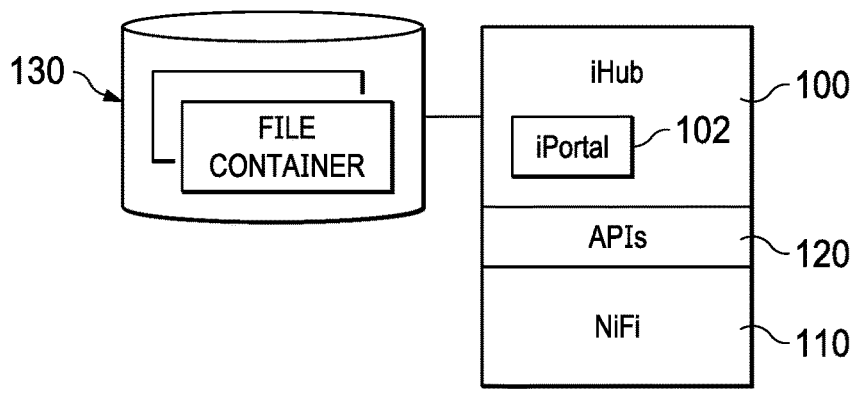
FIG. 1 depicts a diagrammatic representation of the structure of an integrated scalable analytics platform and dynamic runtime ETL tool in accordance with one embodiment.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

It should be noted that, although the description of the exemplary embodiments that follow use the OpenText™ iHub platform, these embodiments are merely illustrative and alternative embodiments may be implemented in various other analytics server platforms. Similarly, although the embodiments below are implemented using in conjunction with the NiFi ETL tool, alternative embodiments may be implemented using various other ETL tools.

OpenText™ Information Hub (iHub), available from Open Text, is an example of a scalable analytics and data visualization platform that can leverage data from disparate sources in an enterprise computing environment. iHub is a web-based application that enables a user to design, deploy, and manage secure, interactive web applications, reports, and dashboards fed by multiple data sources. In some embodiments, an enterprise computing environment may further include an advanced analytics system, a comprehensive query and reporting system, and a developer platform for data scientists. Data scientists can consume data stored in a data store to train, validate, and use models (e.g., ML based models and some particular purpose models). For example, a data scientist can consume data stored in a data store to train, validate, and use a model to gain insight on consumer opinion on a product, useful for customer experience management (CEM) in understanding customer behavior, grouping, targeting, messaging, etc.

Various embodiments of the invention provide an integrated multi-user system that leverages a dynamic runtime ETL tool (e.g., Apachi NiFi) and runs on a scalable analytics server platform (e.g., iHub). The inventive subject matter is embodied in an integration module that interfaces the dynamic runtime ETL tool and the scalable analytics server platform, allowing dataflows created or developed in a dynamic runtime environment provided by the ETL tool to be saved in a dataflow file container, which is a novel file structure. A dataflow which is saved in this manner can then be shared, managed, and/or executed in a multi-user environment provided by the scalable analytics server platform (e.g., through a platform user interface such as iPortal).

In one embodiment, a scalable analytics and data visualization platform such as iHub is interfaced with a dynamic runtime ETL tool such as NiFi as shown in FIG. 1. As depicted in the figure, iHub platform 100 accesses ETL tool 110 (e.g., NiFi) via an API layer 120. iHub platform 100 provides a user interface 102 (e.g., iPortal) which allows users to select particular dataflow assets that they wish to access (e.g., create, modify or run). These assets are stored by iPortal in file containers in a data store 130, wherein each file container contains a separate dataflow. When a user selects dataflow in iPortal to be accessed, the corresponding file container is accessed to retrieve the dataflow in the file container, and iHub accesses the NiFi APIs to perform a selected action. For instance, if the user elects to modify a specific dataflow, this dataflow is opened in a NiFi canvas, and the user can modify the dataflow directly in the NiFi canvas. The user may alternatively be able to perform actions such as running the dataflow without opening a NiFi canvas. After the selected action has been performed, the dataflow is stored in the file container.

Figure 2:
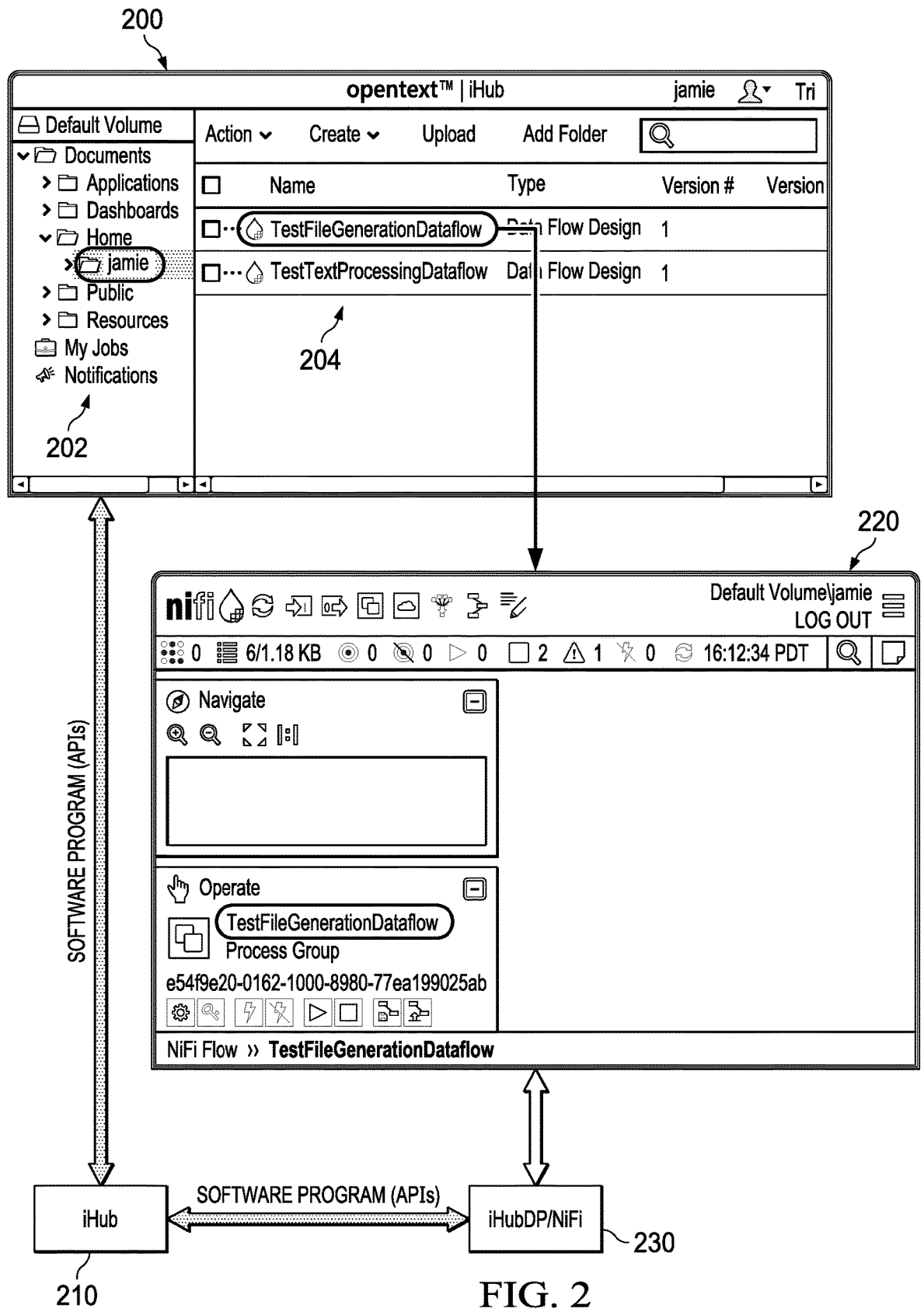
FIG. 2 depicts a diagrammatic representation of a user interface for an integrated scalable analytics platform and dynamic runtime ETL tool in accordance with one embodiment.

Referring to FIG. 2, a user interface screen 200 for the iHub software application 210 is depicted. This interface may be referred to as iPortal. The iPortal interface provides a means for users to save files in a directory structure 202 such as the one that is shown on the left side of the user interface screen. When a user logs onto the system using interface 200, the user can open a corresponding folder in directory structure 202 to view that user's assets 204. The user can, in one embodiment, hover a cursor over the dots shown to the left of each asset (e.g., using a mouse) to display an action menu which includes a set of possible actions that can be taken with respect to the corresponding asset. The assets may include for example, dataflows of the type that are created in a NiFi environment. There is no structure in the NiFi environment which is equivalent to the directory structure showing the assets of the user because NiFi does not allow users to organize dataflows into files. Users simply keep building dataflows, and can only save them as processor groups or templates.

As shown in FIG. 2, iPortal 200 communicates with iHub 210 via iHub APIs. The NiFi canvas 220 communicates via NiFi APIs with a data process 230 which, in this embodiment, is called "iHubDP" (which refers to the iHub/NiFi data pipeline). IHub application 210 also communicates with iHubDP 230 via corresponding APIs.

iHub maps processor groups from the NiFi environment. iHub creates a file container that stores a NiFi dataflow. The user may create a new dataflow in the iHub user interface screen, which will then open a NiFi canvas 220 as shown in the lower part of the figure. Alternatively, the user may open a NiFi canvas 220 via the iPortal interface 200, create a dataflow within the NiFi canvas, and then save the dataflow as an asset of the user that can be displayed and accessed via the iPortal interface.

Figure 3:
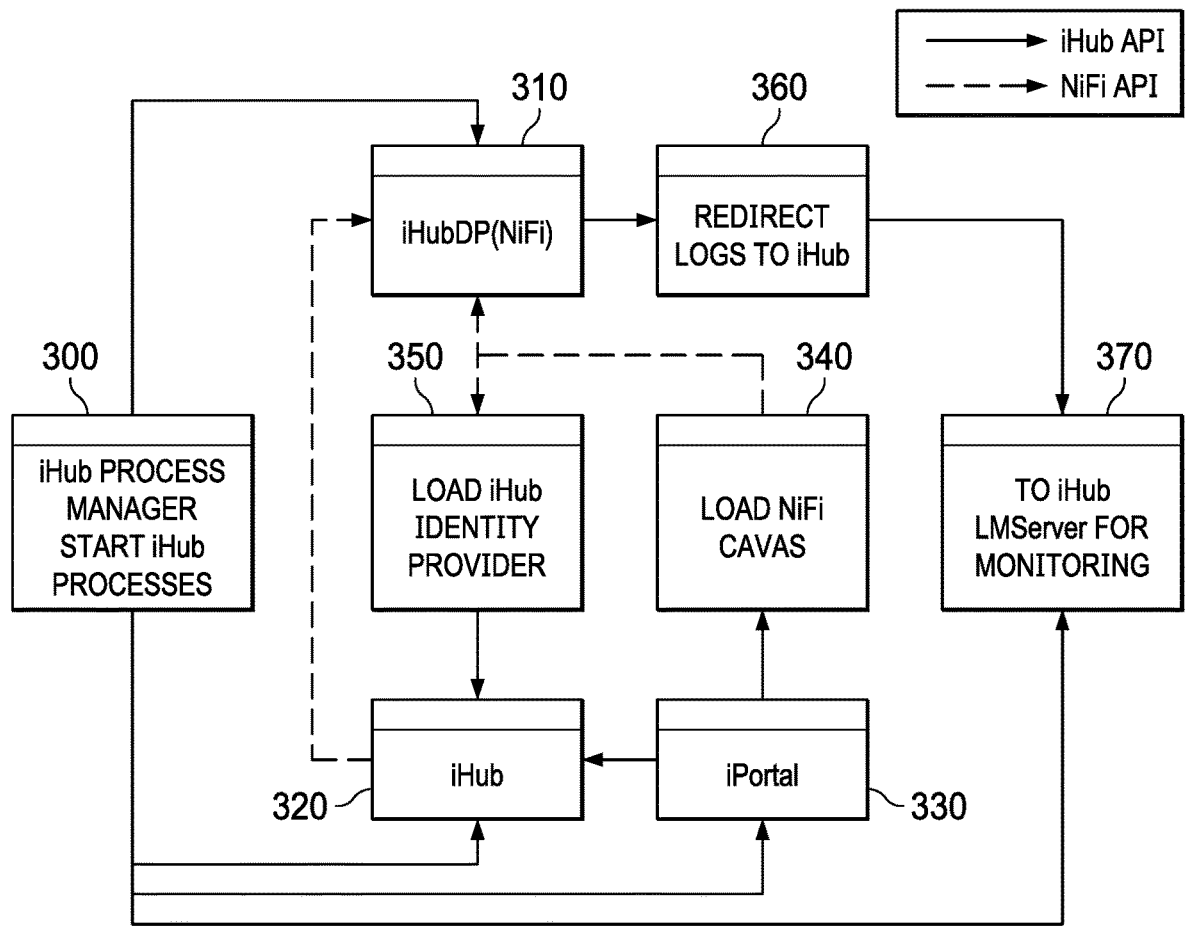
FIG. 3 depicts a diagrammatic representation of a process flow associated with an integrated scalable analytics platform and dynamic runtime ETL tool in accordance with one embodiment.

Referring to FIG. 3, a diagram illustrating a process flow associated with the integration of iHub and NiFi in accordance with one embodiment is shown. In this figure, iHub APIs are represented by solid lines, while NiFi APIs are represented by dashed lines. When a user goes into the user interface and use any of the functions in the interface, these functions are implemented using the processes and APIs illustrated in FIG. 3.

When the analytics server platform starts, iHub process manager 300 initiates the various processes that support the user actions initiated through the iPortal interface. IHub process manager 300 starts iHubDP 310, which is a process that serves as a data pipeline for communication between iHub and NiFi. The instance of NiFi actually runs inside iHub DP 310.

IHub process manager 300 also starts iHub application core process 320 and the iPortal process 330, which supports the iPortal user interface. IHub process manager 300 also starts iHub LMServer 370, which performs logging and monitoring.

When these processes are started up, the user can type a URL into the browser (including, for example, a local host name, port number, and iPortal) to start iPortal as the iHub user interface. When iPortal comes up, it communicates with iHub via the iHub APIs. iPortal communicates with iHub via the iHub APIs. In order for iPortal to load up the NiFi user interface within the browser, iPortal calls the API into iHub to request that the NiFi interface be opened. iHub then calls a NiFi API via the iHubDP process 310 to open up the interface (the NiFi canvas). IHub then gives the connection back to iPortal. IPortal then loads the NiFi canvas 340.

Once this process is complete and the NiFi canvas is open in the browser, the user can work on dataflows in the NiFi canvas. The user interacts directly with NiFi process at this point through the NiFi canvas.

When you're done with this, there are two things that happen. First, the original artifact, the definition of the dataflow, is stored within the NiFi server. Inside iHub, there is metadata being trapped (see 360). This metadata identifies the dataflow, and is stored by iHub as a dataflow file. This file can be viewed through the iPortal user interface.

Consider the case in which a user wants to create a new dataflow. Inside iPortal, the user indicates that he wants to create a new dataflow. IPortal presents a dialog to the user requesting information, such as the name or description of the dataflow. The user provides this information, and then iHub internally creates an object inside NiFi. This object is then tracked by iHub. When the NiFi canvas is open, the object is there when the user builds a dataflow. Any of the dataflow built within NiFi is then tracked by the object. The object will keep track of the dataflow until the dataflow is deleted. The object serves as a file container for the dataflow. If the user wants to create a new dataflow, a new object is created to track the dataflow.

IHub identity provider—iHub is one system and NiFi is another system. Each one has its own user management systems. NiFi has a programming infrastructure that allows a user to plug-in his own user identity management. IHub provides the iHub identity provider 350, so that when NiFi loads, the information from the iHub identity provider 350 provides information that is loaded into the NiFi identity manager. The NiFi identity manager will then communicate with iHub to get user information. This enables NiFi to use the entire set of iHub users, so that a user can simply login, and security will be maintained with respect to which users have access to which information. Thus, the system provides authentication or verification of user identity as users login to iHub and then access NiFi as allowed by the permissions indicated in iHub.

Figure 4:
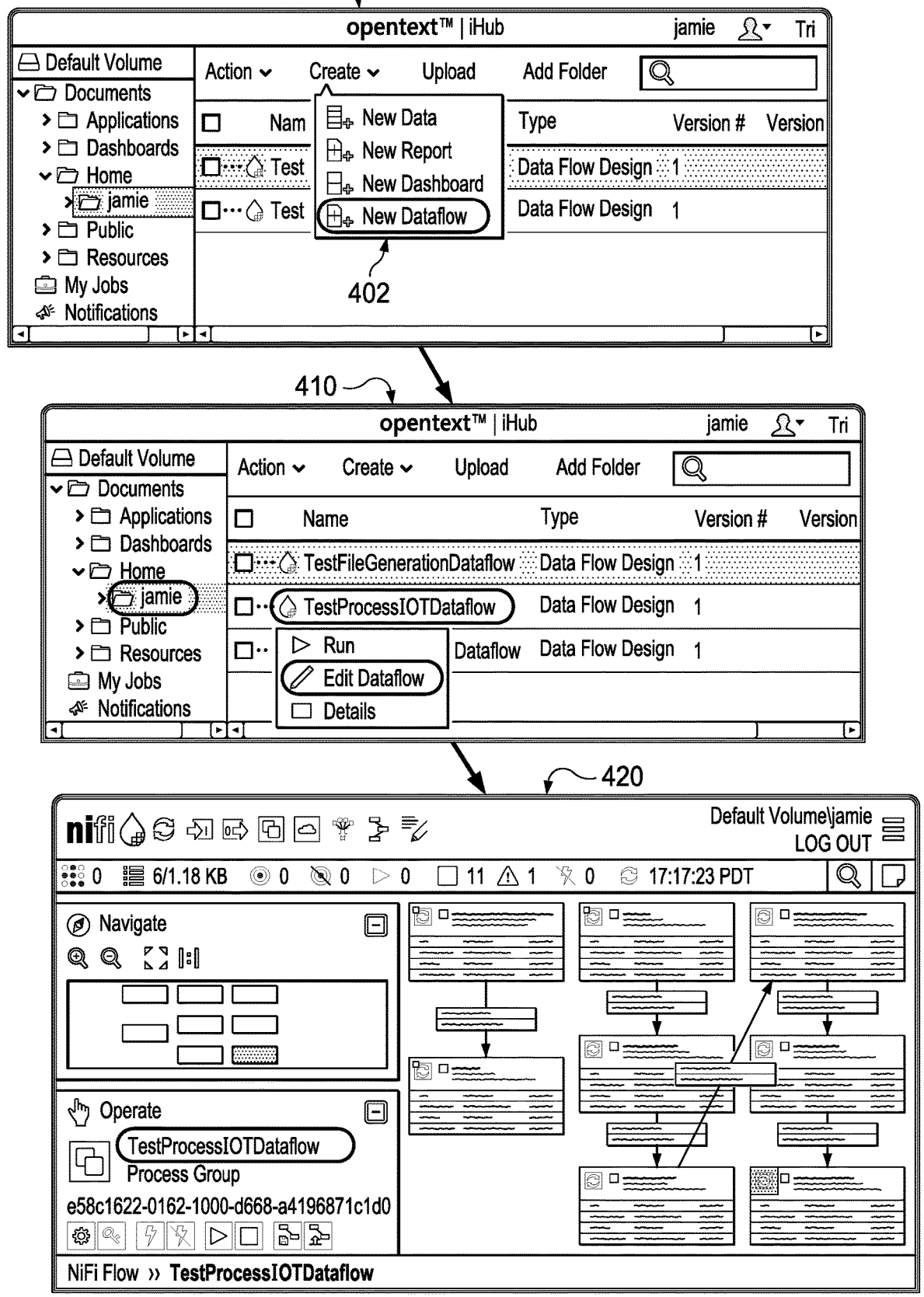
FIG. 4 depicts a diagrammatic representation of a user model flow associated with a user interface of an integrated scalable analytics platform and dynamic runtime ETL tool in accordance with one embodiment.

Referring to FIG. 4, a diagram illustrating an exemplary user interface and user model flow is shown. This figure demonstrates the process the user will see when accessing NiFi through the iPortal and iHub.

The screen 400 shown on the top of the figure shows where the user will login. In this example, the user is "jamie". When the user has logged in, he may perform various actions. For example, the user may create a new dataflow. The user can click on "Create", "New Dataflow", and enter the name of the new dataflow, which is then created. In this example, the name TestProcessIOTDataflow is given. IHub uses this information to create an object—a dataflow file container. This object is created before any dataflow is created in NiFi. The object is created within the NiFi process to track the dataflow that will be created. The creation of the object by iHub is done behind the scenes—it is transparent to the user.

After the object has been created, it is displayed in the iPortal interface as one of the user's assets. This is shown in the middle of the figure (screen 410). "Screen 410 is still the iPortal user interface". To the left of each asset is a set of three dots. When the user clicks on, or hovers the cursor over these dots, a drop-down menu of actions is displayed. The possible actions that can be taken with respect to the dataflow TestProcessIOTDataflow include "Run", "Edit Dataflow", and "Details". "Run" can be selected to run the dataflow without even opening the NiFi canvas. "Edit dataflow" can be selected to enable editing of the dataflow in the NiFi canvas. "Details" can be selected to display information about the workflow. In this example, the user wants to edit the dataflow so "Edit Dataflow" is selected.

After the user selects "edit dataflow", the NiFi canvas is opened. This is shown on the bottom of FIG. 4 (screen 420). The NiFi canvas uses the same name for the dataflow as in the iPortal interface (TestProcessIOTDataflow). Processors can then be created or modified within the dataflow, or the dataflow can be executed as is normally done in the NiFi environment. As noted above, the user can alternatively return to the iPortal screen to run the dataflow. Running the dataflow either way will produce the same results, but running the dataflow from the iPortal interface does not require first opening the NiFi canvas. A running dataflow can also be stopped from the iPortal screen without opening the NiFi canvas. Still further, a user can delete a dataflow from the iPortal interface without opening the NiFi canvas.

iHub's iPortal user interface enables users to organize dataflows in a way that cannot be done directly in the NiFi environment. In the NiFi environment, users cannot separate different dataflows—they can only keep adding more and more elements to a single dataflow. This makes it difficult to organize different flows. iHub allows the users to separately store different dataflows. For example, when using NiFi directly, a user may have different portions of the dataflow that concern very different processes or involve different types of data. These different portions of the dataflow in NiFi cannot be separated into different dataflows. When using the iPortal interface, however, a user may, for instance, have one dataflow that deals only with IOT data, while a separate dataflow deals with storing data. Each of these dataflows is separately stored in its own individual file container and can be separately run, modified, or deleted. As a result, the user can separate and organize dataflows in a way that can't be done in a NiFi canvas.

It should be noted that, in the context of multiple users, all of the users in a NiFi environment share a single NiFi canvas. Different users may only be concerned with certain parts of the dataflow within the canvas, but they cannot keep those parts of the dataflow separate from the portions that concern other users. Consequently, users cannot control their respective portions of the dataflow and cannot control access to these portions of the dataflow. Each user sees and has access to the entire canvas and all of the different parts of the dataflow within the canvas. This can be very unwieldy and confusing and, as noted above, can make it very difficult to organize different parts of the dataflow within the canvas that may be totally unrelated to each other.

IHub, on the other hand, allows users to keep different dataflows separate. Individual dataflows that are associated with a particular user are accessible by that user, and are not accessible to others unless the user gives them permission to access these dataflows. For instance, in the example of FIG. 4, the only user who can access Jamie's TestProcessIOT-Dataflow asset is Jamie, unless Jamie grants permission to another user. (The system may also be configured to allow administrators or other users with appropriate authority to grant access to the assets of particular users.) Because iHub enables different dataflows to be individually saved in their respective file containers, they are more easily organized (e.g., dataflows concerning a particular process or type of data may be stored together) and access to the different dataflows may be more easily controlled (as compared to a NiFi environment in which all users have access to all portions of a single dataflow).

Figure 5:
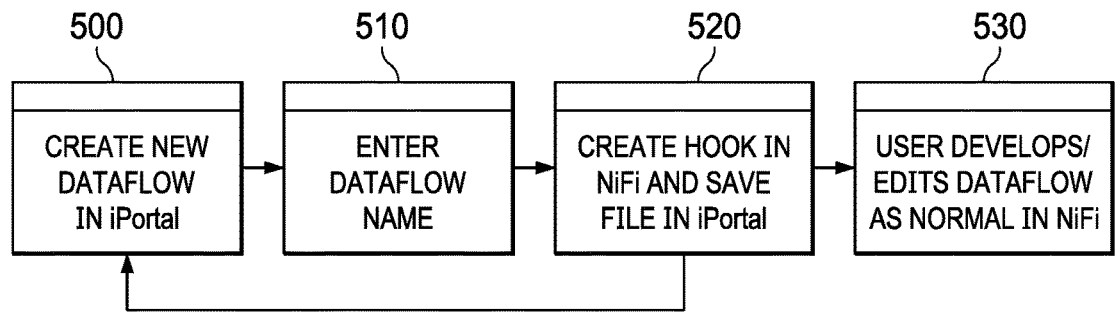
FIG. 5 depicts a diagrammatic representation of a typical control flow of an integrated scalable analytics platform and dynamic runtime ETL tool in accordance with one embodiment.

Referring to FIG. 5, a flow diagram illustrating a typical control flow in accordance with one embodiment. As shown in this figure, a new dataflow is created in the iPortal user interface (500), then a user enters identifying information such as a name and description of the dataflow (510). IPortal then creates a "hook" in NiFi (i.e., creates an object within the NiFi process that allows tracking of the process) and saves the dataflow in a corresponding file container (520). The user then develops and or edits the dataflow in the same manner as is normally done in the NiFi canvas (530). Because the object created by iPortal tracks the development of the dataflow in the NiFi process, this information is available to be stored by iPortal in the file container for the dataflow.

Creating the hook in iPortal is actually done in iHub. IPortal sends a request to iHub, then iHub invokes a NiFi API and creates an object. IHub then returns the object to iPortal. IPortal then opens the object in the NiFi canvas and the user builds or modifies the dataflow in the NiFi canvas, which is running within the iHubDP process. IHub uses the NiFi APIs to create a higher level of abstraction for the user. IHub does not change the NiFi API, but simply uses it to provide a capability that is not provided in the NiFi environment. This allows iHub to create file containers.

Figure 6:
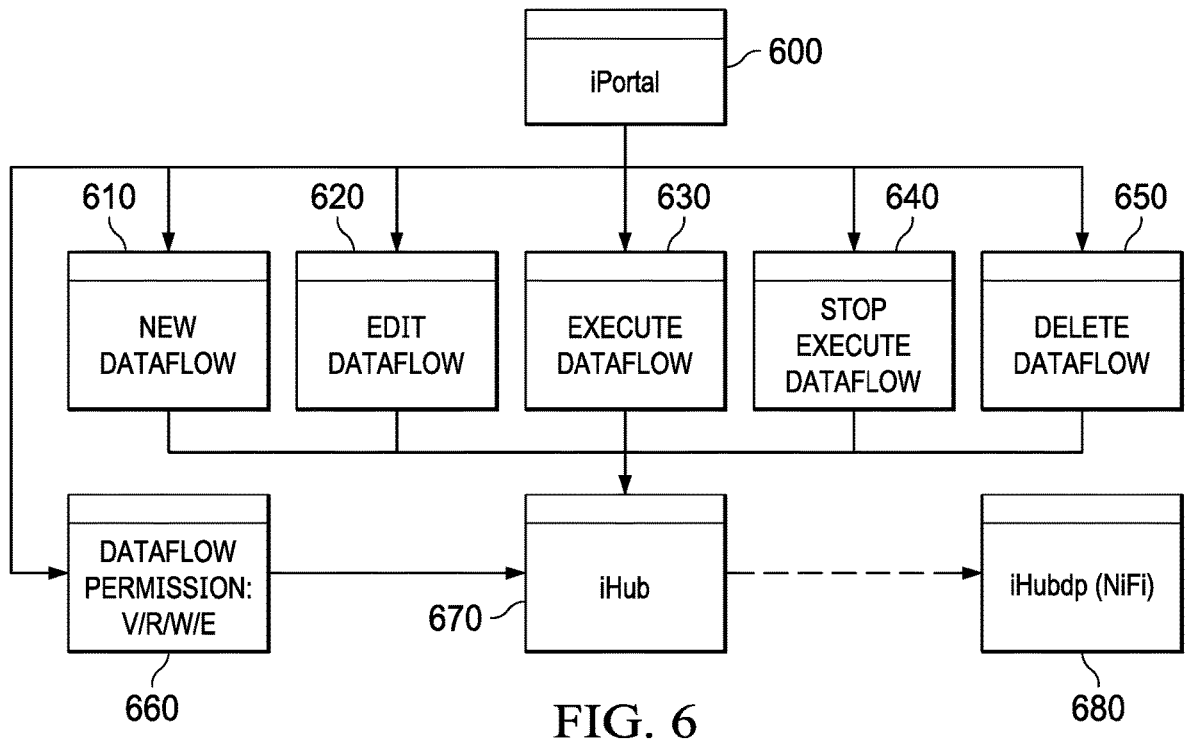
FIG. 6 depicts a diagrammatic representation of the control flow of an exemplary user interface for an integrated scalable analytics platform and dynamic runtime ETL tool in accordance with one embodiment.

As noted above, the present systems and methods enable a user to perform actions with respect to dataflows from the iPortal user interface. FIG. 6 illustrates some of the actions that can be taken by the user. As shown above in FIG. 4, the user can create a new dataflow by selecting "Create" on the menu bar (402) and then selecting "New Dataflow" from the resulting pulldown menu. As represented in FIG. 6, the user would start iPortal 600 and then select the "new dataflow" action 610. This would cause iHub (670) to access NiFi through the iHubDP process (680) and open a new dataflow.

Another way for the user to initiate actions with respect to dataflows (specifically existing dataflows) is to select the action menu represented by the three dots to the left of a dataflow asset name in the iPortal interface (see screenshot 410). This menu can be selected by hovering a cursor over the three dots or clicking on the three dots to cause a drop-down menu of actions to be displayed. As depicted in FIG. 4, only three actions are displayed—"Run", "Edit Dataflow" And "Details". As depicted in FIG. 6, an alternative set of actions that may be taken with respect to existing dataflows is depicted. In this figure, the user may select "Edit Dataflow" (620), "Execute Dataflow" (630), "Stop Execute Dataflow" (640), or "Delete Dataflow" (650). When any one of these actions is selected by the user, iPortal initiates the corresponding action, which causes iHub (670) may access the instance of NiFi running within the iHub DP process (680) and perform the corresponding action. If the user elects to create a new dataflow or edit a dataflow, iHub opens the NiFi canvas to allow the user to develop or modify the dataflow. If the user elects to execute a dataflow, stop execution of a dataflow, or delete a dataflow, iHub can perform these actions without having to open a NiFi canvas.

As shown in FIG. 6, iPortal also has access to dataflow permission functions 660. The permission functions are not explicitly selectable by the user, but instead implement the existing iHub user access permissions scheme. Each user may have permissions associated with corresponding dataflows that allow various levels of access to the dataflows. In one embodiment, the user may have permissions to view, read, write, or execute ("V/R/W/E") corresponding dataflows. These permissions may be independently granted. For example, a user may have permission to view a dataflow at the top level, but not read the content or the data, right (modify) the content, or execute the dataflow. Another user might have permission to view, read and execute the dataflow, but may not have permission to modify the dataflow. The permissions can be set on a per-user, per-dataflow basis. Still other combinations are possible. In one embodiment, the implementation of the iHub permissions scheme by iPortal means that the permissions of each user will be mapped from iHub to NiFi for access for the dataflows that are associated with those users. IHub may achieve this by accessing the NiFi APIs to set the permissions of a processor group to the permissions set in iHub. The permissions may be set to default values when a dataflow is created, but the permissions may be updated by a user with sufficient access permission.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure and various features and advantageous details thereof are explained more fully with reference to the exemplary, and therefore non-limiting, embodiments illustrated and detailed in the accompanying appendices. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions, and/or rearrangements within the spirit and/or scope of the underlying inventive concept will become apparent to those skilled in the art from this disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings in the accompanying appendixes A-E can also be implemented in a more separated or integrated manner, or even removed or rendered as inoperable in certain cases, as is useful in accordance with a particular application. Additionally, any signal arrows in the drawings should be considered only as exemplary, and not limiting, unless otherwise specifically noted.

What is claimed is:

1. A method for controlling user access to dataflows in a common environment of an extract, transform, load (ETL) tool, the method comprising:

presenting a user interface for an analytics server platform, the user interface authenticating the user, displaying to the user a first set of assets for which the user has corresponding access permissions, and hiding from the user a second set of assets for which the user does not have corresponding access permissions;

receiving in the user interface user input indicating an action to be performed with respect to a first dataflow of a plurality of dataflows, wherein the first dataflow is included in the first set of assets and wherein each of the plurality of dataflows being is contained in a corresponding separate file container stored in a data store communicatively connected to the analytics server platform;

the analytics server platform accessing a first file container corresponding to the first dataflow in response to receiving the user input, the analytics server platform accessing one or more application programming interfaces (APIs) of a dynamic runtime ETL tool in which the plurality of dataflows are contained in a single canvas and thereby initiating in the ETL tool the action to be performed with respect to the first dataflow; and the dynamic runtime ETL tool performing the action with respect to the first dataflow.

2. The method of claim 1, further comprising opening a process within the analytics server platform and opening an instance of the dynamic runtime ETL tool within the process of the analytics server platform.

3. The method of claim 2, wherein the action performed by the dynamic runtime ETL tool is tracked by the process of the analytics server platform, and wherein information obtained through the tracking of the action performed by the dynamic runtime ETL tool is stored by the process of the analytics server platform in the first file container.

4. The method of claim 1, wherein the dynamic runtime ETL tool comprises a NiFi ETL tool.

5. The method of claim 1, further comprising storing in the data store a plurality of separate file containers including the first file container, wherein each of the file containers in the plurality of file containers stores a corresponding separately accessible dataflow.

6. The method of claim 5, wherein the analytics server platform presents separate instances of the user interface to different users in a multi-user environment, wherein a first instance of the user interface displays a first set of dataflows corresponding to a first subset of the file containers to a first one of the different users and a second instance of the user interface displays a second set of dataflows corresponding to a first subset of the file containers to a second one of the different users, wherein the first subset of the file containers is different from the second subset of the file containers.

7. A system comprising:
a processor; and
a non-transitory computer-readable medium storing instructions translatable by the processor to implement:
a dynamic runtime extract, transform, run (ETL) tool in which a plurality of dataflows are contained in a single canvas;
wherein the ETL tool provides a capability for a user to create or modify a first dataflow of the plurality of dataflows;
wherein the ETL tool does not directly provide a capability for the user to save the first dataflow to a file apart from the plurality of dataflows;
a data analytics server platform communicatively connected to a data store;
wherein the data analytics server platform is adapted to interface with a runtime instance of the ETL tool by accessing application programming interfaces (APIs) of the ETL tool;
wherein the data analytics server platform provides a capability for the user to save each of the plurality of dataflows in a corresponding separate file container in the data store and to enable an action to be separately performed with respect to the first dataflow;
wherein the data analytics server platform is adapted to present a user interface to the user, wherein the user interface is adapted to authenticate the user, display to the user a first set of assets for which the user has corresponding access permissions, the first set of assets including the first dataflow, and hide from the user a second set of assets for which the user does not have corresponding access permissions.

8. The system of claim 7:
wherein the data analytics server platform is adapted to present a user interface to a user;
wherein the user interface is adapted to receive user input indicating an action to be performed with respect to the first dataflow;

wherein in response to receiving the user input, the analytics server platform is adapted to access one or more application programming interfaces (APIs) of the dynamic runtime ETL tool and thereby initiate in the ETL tool the action to be performed with respect to the first dataflow; and
wherein the dynamic runtime ETL tool performs the action with respect to the first dataflow.

9. The system of claim 7, wherein the data analytics server platform is adapted to open an instance of the dynamic runtime ETL tool within a process of the analytics server platform.

10. The system of claim 9, wherein the process of the analytics server platform is adapted to track the action performed by the dynamic runtime ETL tool and to store information obtained through the tracking of the action performed by the dynamic runtime ETL tool in the first file container.

11. The system of claim 7, wherein the dynamic runtime ETL tool comprises a NiFi ETL tool.

12. The system of claim 7, wherein the data analytics server platform is adapted to store in the data store a plurality of separate file containers including the first file container,
wherein each of the file containers in the plurality of file containers stores a corresponding separately accessible dataflow.

13. The system of claim 7, wherein the analytics server platform is adapted to present separate instances of the user interface to different users in a multi-user environment, wherein a first instance of the user interface displays a first set of dataflows corresponding to a first subset of the file containers to a first one of the different users and a second instance of the user interface displays a second set of dataflows corresponding to a first subset of the file containers to a second one of the different users, wherein the first subset of the file containers is different from the second subset of the file containers.

14. A computer program product comprising a non-transitory computer-readable medium storing instructions translatable by a processor to perform a method for controlling user access to dataflows in a common environment of an extract, transform, load (ETL) tool, the method including:
presenting a user interface for an analytics server platform;
authenticating the user;
displaying to the user a first set of assets for which the user has corresponding access permissions;
hiding from the user a second set of assets for which the user does not have corresponding access permissions;
receiving in the user interface user input indicating an action to be performed with respect to a first dataflow of a plurality of dataflows, wherein the first dataflow is included in the first set of assets and wherein each of the plurality of dataflows being is contained in a corresponding separate file container stored in a data store communicatively connected to the analytics server platform;
accessing, by the analytics server platform, a first file container corresponding to the first dataflow;
in response to receiving the user input, accessing, by the analytics server platform, one or more application programming interfaces (APIs) of a dynamic runtime ETL tool in which the plurality of dataflows are contained in a single canvas and thereby initiating in the ETL tool the action to be performed with respect to the first dataflow; and performing, by the dynamic runtime ETL tool, the action with respect to the first dataflow.

15. The computer program product of claim 14, wherein the instructions are further translatable by the processor to perform: opening a process within the analytics server platform and opening an instance of the dynamic runtime ETL tool within the process of the analytics server platform.

16. The computer program product of claim 14, wherein the dynamic runtime ETL tool comprises a NiFi ETL tool.

17. The computer program product of claim 14, wherein the instructions are further translatable by the processor to perform: storing in the data store a plurality of separate file containers including the first file container; wherein each of the file containers in the plurality of file containers stores a corresponding separately accessible dataflow; wherein the analytics server platform presents separate instances of the user interface to different users in a multi-user environment; wherein a first instance of the user interface displays a first set of dataflows corresponding to a first subset of the file containers to a first one of the different users and a second instance of the user interface displays a second set of dataflows corresponding to a first subset of the file containers to a second one of the different users; and wherein the first subset of the file containers is different from the second subset of the file containers.

* * * * *